United States Patent
Bagepalli et al.

[11] Patent Number: 6,113,349
[45] Date of Patent: Sep. 5, 2000

[54] TURBINE ASSEMBLY CONTAINING AN INNER SHROUD

[75] Inventors: Bharat Sampathkumaran Bagepalli, Niskayuna; Gregory Scot Corman, Ballston Lake; Anthony John Dean, Scotia; Paul Stephen DiMascio, Clifton Park; Massoud Mirdamadi, Niskayuna, all of N.Y.

[73] Assignee: General Electric Company, Schenectady, N.Y.

[21] Appl. No.: 09/300,691

[22] Filed: Apr. 27, 1999

Related U.S. Application Data

[60] Provisional application No. 60/102,193, Sep. 28, 1998.

[51] Int. Cl.$^7$ .................................................. F01D 11/08
[52] U.S. Cl. ...................... 415/135; 415/136; 415/138; 415/139; 415/173.1; 415/173.3; 415/200
[58] Field of Search ................................. 415/135, 136, 415/138, 139, 200, 173.1, 173.3, 174.2, 173.6

[56] References Cited

U.S. PATENT DOCUMENTS

| | | |
|---|---|---|
| 807,146 | 12/1905 | Westinghouse .......................... 415/135 |
| 4,087,199 | 5/1978 | Hemsworth et al. ................. 415/173.3 |
| 4,398,866 | 8/1983 | Hartel et al. .......................... 415/173.1 |
| 4,596,116 | 6/1986 | Mandet et al. . |
| 4,759,687 | 7/1988 | Miracourt et al. ....................... 415/138 |
| 5,228,828 | 7/1993 | Damlis et al. . |
| 5,346,362 | 9/1994 | Bonner et al. . |
| 5,423,659 | 6/1995 | Thompson . |

FOREIGN PATENT DOCUMENTS

| | | |
|---|---|---|
| 57-195803 | 12/1982 | Japan . |
| 63-239301 | 10/1988 | Japan ................................. 415/174.2 |
| 9512056 | 5/1995 | WIPO . |

*Primary Examiner*—Christopher Verdier
*Attorney, Agent, or Firm*—Marvine Snyder; Douglas E. Stoner

[57] ABSTRACT

A turbine assembly having a turbine stator, a ceramic inner shroud, and a first spring. The stator has a longitudinal axis and an outer shroud block with opposing and longitudinally outward facing first and second sides. The first side has a longitudinally outward projecting first ledge and has a first side portion located radially outward of the first ledge. The ceramic inner shroud has a first hook portion longitudinally and radially surrounding the first ledge. The first spring is attached to one of the first side portion and the first hook portion and unattachedly and resiliently contacts the other of the first side portion and the first hook portion.

20 Claims, 3 Drawing Sheets

TURBINE ASSEMBLY CONTAINING AN INNER SHROUD

This application claims priority of a Provisional Application entitled "Ceramic Components" by Bharat S. Bagepalli, et al., U.S. Ser. No. 60/102,193 filed Sep. 28, 1998.

The U.S. Government may have certain rights in this invention pursuant to contract number DEFC02-92-CE41000 awarded by the U.S. Department of Energy.

BACKGROUND OF THE INVENTION

The present invention relates generally to turbines, and more particularly to a turbine assembly containing an inner shroud.

Turbine assemblies include, without limitation, turbine sections of steam turbines and compressor and/or turbine sections of gas turbines. Steam and gas turbines are used, among other purposes, to power electric generators, and gas turbines also are used, among other purposes, to propel aircraft and ships. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one circumferential row of rotating blades. The free ends or tips of the rotating blades are surrounded by a stator casing. The radial gap between the blade tips and the stator casing is made small for increased efficiency of the turbine.

Typically, as shown in prior-art FIG. 1, a metal inner shroud 2 (such as one made of Inconel®), has been attached through mating slots to a circumferential segment of an outer shroud block 4 of the stator casing 6 and is spaced apart from the blade tips 8. The metal inner shroud 2 is subject to heat distortion because of high thermal gradients in the shroud area of the turbine. Such heat distortion places the inner shroud 2 and the outer shroud block 4 under significant mechanical stresses. What is needed is a turbine assembly whose inner shroud is more heat resistant and less subject to mechanical stress.

BRIEF SUMMARY OF THE INVENTION

Broadly described, an exemplary turbine assembly of the present invention has a turbine stator, a ceramic inner shroud, and a first spring. The stator has a longitudinal axis and an outer shroud block. The outer shroud block has a circumferential segment, wherein the circumferential segment has longitudinally spaced apart, generally opposing, and generally longitudinally outward facing first and second sides. The first side has a generally longitudinally outward projecting first ledge and has a first side portion located radially outward of the first ledge. The ceramic inner shroud includes a first hook portion longitudinally and radially surrounding the first ledge. The first spring is attached to one of the first side portion and the first hook portion, and the first spring unattachedly and resiliently contacts the other of the first side portion and the first hook portion.

Several benefits and advantages are derived from the invention. The ceramic inner shroud is heat resistant. The inward-facing first hook portion of the ceramic inner shroud is easy to manufacture and, when the ceramic is a ceramic matrix composite, provides continuous reinforcing fibers from the hook region to the hot gas path face which is desirable to maintain structural integrity and dimensional stability of the ceramic inner shroud. In the exemplary turbine assembly, the first hook portion is resiliently positioned in place on the first ledge by the first spring which allows for some relative thermal deformation of the ceramic inner shroud and the shroud-block circumferential segment while preventing substantial mechanical loading of the ceramic inner shroud.

DETAILED DESCRIPTION OF THE INVENTION

Figure 1:
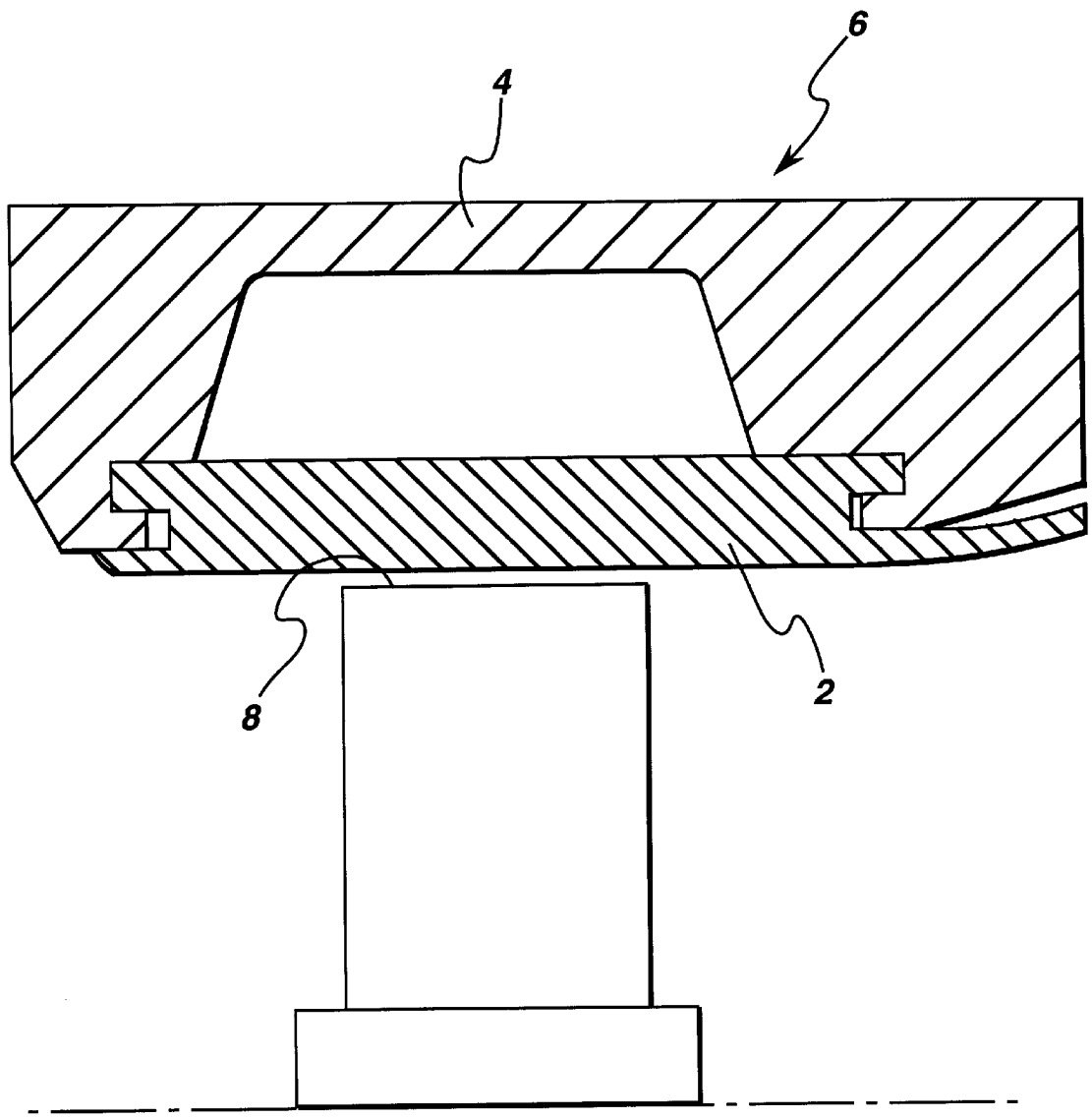
FIG. 1 is a cross-sectional view of a prior-art turbine assembly including a prior-art inner shroud, such cross-sectional view taken by a cutting plane wherein the longitudinal axis of the stator of the turbine assembly lies in the cutting plane.
Figure 2:
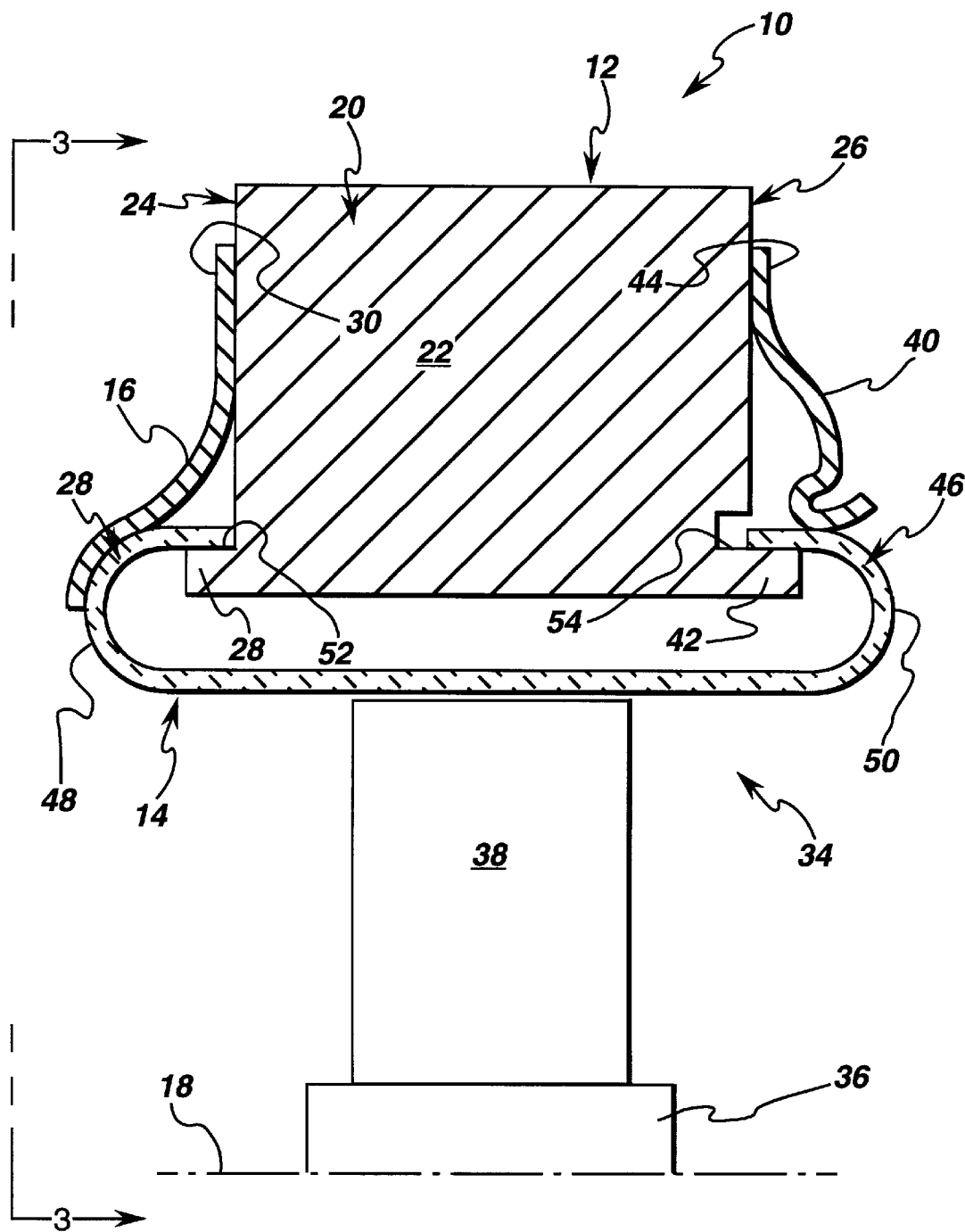
FIG. 2 is a view, as in FIG. 1, but of an exemplary turbine assembly of the present invention.
Figure 3:
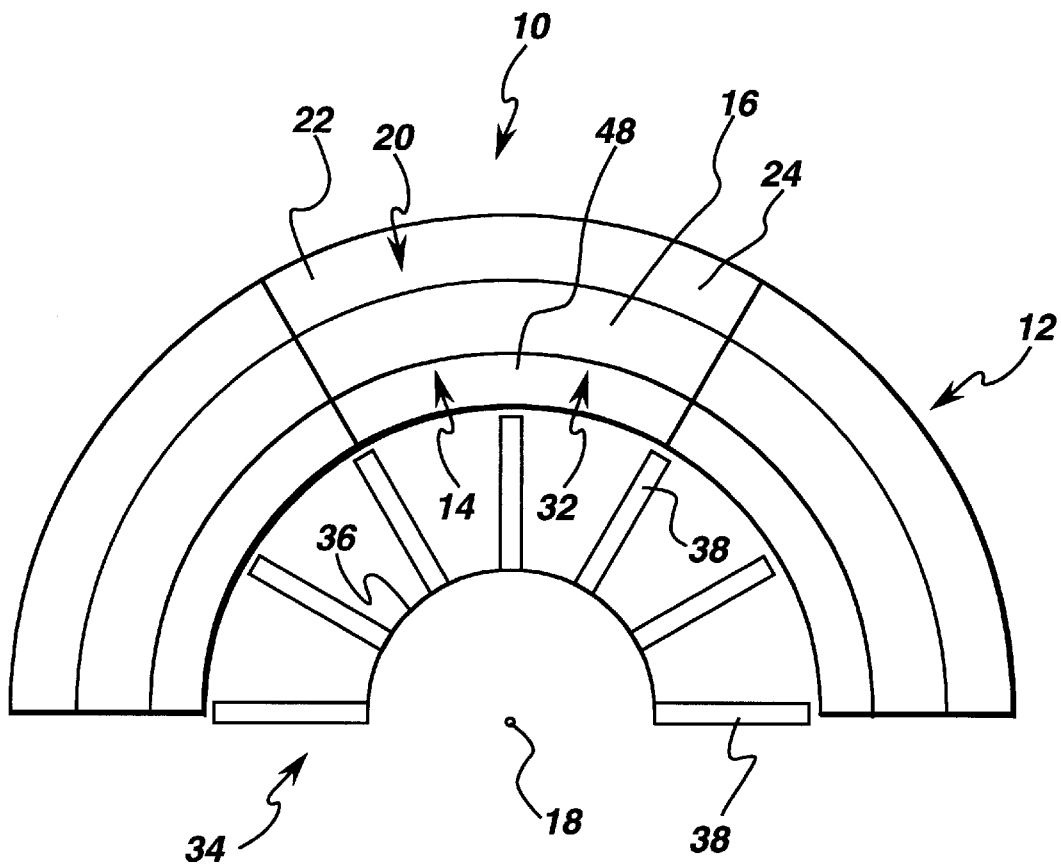
FIG. 3 is a view of the exemplary turbine assembly of FIG. 2 taken along lines 3—3 of FIG. 2.

Referring now to FIGS. 2 and 3 of the drawings, wherein like numerals represent like elements throughout, there is shown an exemplary turbine assembly 10 of the present invention. The term "turbine", as used herein, includes, without limitation, turbine sections of steam turbines and compressor and/or turbine sections of gas turbines.

Broadly described, the exemplary turbine assembly 10 of the present invention includes a turbine stator 12, a ceramic inner shroud 14, and a first spring 16. A ceramic inner shroud 14 is defined to be an inner shroud comprising a ceramic material. The stator 12 has a longitudinal axis 18 and an outer shroud block 20. The outer shroud block 20 has a circumferential segment 22. The circumferential segment 22 has longitudinally spaced apart, generally opposing, and generally longitudinally outward facing first and second sides 24 and 26. The first side 24 has a generally longitudinally outward projecting first ledge 28 and has a first side portion 30 disposed radially outward of the first ledge 28. The ceramic inner shroud 14 includes a first hook portion 32 longitudinally and radially surrounding the first ledge 28. The first spring 16 is attached to one of the first side portion 30 and the first hook portion 32, and the first spring 16 unattachedly and resiliently contacts the other of the first side portion 30 and the first hook portion 32.

As shown in FIGS. 2 and 3, a turbine 34 typically includes, without limitation, the turbine assembly 10, a rotatable shaft 36, and a circumferential row of rotor blades 38 attached to the rotatable shaft 36. As used herein, a "circumferential segment" includes a complete inner shroud or a circumferential portion thereof. By "generally longitudinally outward facing" is meant that the first and second sides 24 and 26 are not generally radially or longitudinally inward facing. In describing the turbine assembly 10, the term "surrounds" or "surrounding" means generally surrounds or generally surrounding, and in describing the ceramic inner shroud 14, a "hook portion" includes the end of the hook.

In one example, the first ledge 28 defines a radially-innermost portion of the first side 24, and the first ledge 28 is aligned generally parallel to the longitudinal axis 18 of the stator 12. Here, the first side portion 30 of the first side 24 is aligned generally perpendicular to the longitudinal axis 18. In this design, the first spring 16 is a leaf spring. Choices for the material of the leaf spring include, without limitation, a leaf spring comprising, or consisting essentially of, a metal material (such as Inconel® 750) or a leaf spring comprising, or consisting essentially of, a ceramic material (such as silicon carbide or silicon nitride). The leaf spring may include a woven cloth layer (such as one made of Haynes®-25 material) fused to the side of the leaf spring facing the ceramic inner shroud 14 and the outer shroud block 20 for wear resistance. In one example, the circumferential segment 22 of the outer shroud block 20 consists essentially of metal, and the ceramic inner shroud 14 consists essentially of a ceramic matrix composite. The term "metal" includes an alloy. The phrase "ceramic matrix composite" is defined to be a material having any (metal or non-metal) fiber filament embedded in any ceramic matrix binder. An example of a ceramic matrix composite is a silicon carbide based, silicon melt infiltrated, ceramic composite wherein the fiber filament is a continuous silicon-carbide fiber.

In an exemplary embodiment, the turbine assembly 10 includes a turbine stator 12, a ceramic inner shroud 14, and first and second springs 16 and 40. A ceramic inner shroud 14 is defined to be an inner shroud comprising a ceramic material. The stator 12 has a longitudinal axis 18 and an outer shroud block 20. The outer shroud block 20 has a circumferential segment 22. The circumferential segment 22 has longitudinally spaced apart, generally opposing, and generally longitudinally outward facing first and second sides 24 and 26. The first side 24 has a generally longitudinally outward projecting first ledge 28 and has a first side portion 30 disposed radially outward of the first ledge 28. The second side 26 has a generally longitudinally outward projecting second ledge 42 and has a second side portion 44 disposed radially outward of the second ledge 42. The ceramic inner shroud 14 includes longitudinally spaced apart, generally opposing, and generally longitudinally inward facing first and second hook portions 32 and 46. The first hook portion 32 longitudinally and radially surrounds and contacts the first ledge 28. The second hook portion 46 longitudinally and radially surrounds and contacts the second ledge 42. The first spring 16 is attached to one of the first side portion 30 and the first hook portion 32, and the first spring 16 unattachedly and resiliently contacts the other of the first side portion 30 and the first hook portion 32. The second spring 40 is attached to one of the second side portion 44 and the second hook portion 46, and the second spring 40 unattachedly and resiliently contacts the other of the second side portion 44 and the second hook portion 46.

By "generally longitudinally outward facing" is meant that the first and second sides 24 and 26 are not generally radially or longitudinally inward facing. By "generally inward facing" is meant that the first and second hook portions 32 and 46 generally face longitudinally toward each other. The first and second hook portions 32 and 46 shown in FIG. 2 would still be considered to be generally inward facing even if they were of unequal radial distances from the longitudinal axis 18.

As shown in FIGS. 2 and 3, it is desired, but not required, that the first and second ledges 28 and 42 be disposed an equal first radial distance from the longitudinal axis 18 of the stator 12 and extend an equal second radial distance in a radially-outward direction (i.e., have the same radial thickness). For unequally radially-disposed and/or unequally radially-extending first and second ledges 28 and 42, the first and second hook portions 32 and 46 would be unequally shaped and adapted to longitudinally and radially surround their respective first and second ledges 28 and 42. The shape of the first and second side portions 30 and 44 (i.e., the shape of the outer shroud block 20 radially outward of the respective first and second ledges 28 and 42 and either attached to, or unattachedly in contact with, the respective first and second springs 16 and 40) is arbitrary except for allowing the first and second hook portions 32 and 46 to longitudinally and radially surround their respective first and second ledges 28 and 42. In one example, the first side portion 30 is aligned generally perpendicular to the longitudinal axis 18 of the stator 12, and the second side portion 44 is aligned generally perpendicular to the longitudinal axis 18 of the stator 12. However, the first and second side portions 30 and 44 need not be perpendicular to the longitudinal axis 18.

In one design, the first hook portion 32 of the ceramic inner shroud 14 has a first curved region 48, and the second hook portion 46 of the ceramic inner shroud 14 has a second curved region 50. The first and second curved regions 48 and 50 have longitudinally-outermost points which are longitudinally spaced apart a first longitudinal distance. The ceramic inner shroud 14 has a longitudinal length equal to the first longitudinal distance. Thus, the first and second hook portions 32 and 46 define the longitudinal ends of the ceramic inner shroud 14.

In one example, the first ledge 28 is aligned generally parallel to the longitudinal axis 18 of the stator 12, and the second ledge 42 is aligned generally parallel to the longitudinal axis 18 of the stator 12. The first ledge 28 has a radially-outermost first surface 52 which is parallel to the longitudinal axis 18, and the first hook portion 32 contacts the first surface 52. Likewise, the second ledge 42 has a radially-outermost second surface 54 which is parallel to the longitudinal axis 18, and the second hook portion 46 contacts the second surface 54. Here, the first ledge 28 defines a radially-innermost portion of the first side 24 of the circumferential segment 22 of the outer shroud block 20, and the second ledge 42 defines a radially-innermost portion of the second side 26 of the circumferential segment 22 of the outer shroud block 20. Other than the first and second surfaces 52 and 54, the ceramic inner shroud 14 is spaced apart from the outer shroud block 20.

In one construction, the first spring 16 is a first leaf spring, and the second spring 40 is a second leaf spring. Choices for the material of the first and second leaf springs include, without limitation, a leaf spring comprising, or consisting essentially of, a metal material or a leaf spring comprising, or consisting essentially of, a ceramic material. in one example, the circumferential segment 22 of the outer shroud block 20 consists essentially of metal, and the ceramic inner shroud 14 consists essentially of a ceramic matrix composite. The term "metal" includes an alloy. The phrase "ceramic matrix composite" is defined to be a material having any (metal or non-metal) fiber filament embedded in any ceramic matrix binder. An example of a ceramic matrix composite is a silicon carbide based, silicon melt infiltrated, ceramic composite wherein the fiber filament is a continuous, reinforcement, silicon-carbide fiber.

Several benefits and advantages are derived from the invention. The ceramic inner shroud 14 is heat resistant. The inward-facing first and second hook portions 32 and 46 of the ceramic inner shroud 14 are easy to manufacture and provide continuous reinforcing fibers from the hook region to the hot gas path face which is desirable to maintain structural integrity and dimensional stability of the ceramic inner shroud 14. In the turbine assembly 10, having the hook portions 32 and 46 surround their respective ledges 28 and 42 and having the springs 16 and 40 resiliently interact between their respective side portions 30 and 44 and hook portions 32 and 46 allows for some relative thermal deformation of the ceramic inner shroud 14 and the shroud-block circumferential segment 22 while preventing substantial mechanical loading of the ceramic inner shroud 14.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A turbine assembly comprising:
    a) a turbine stator having a longitudinal axis and an outer shroud block, wherein said outer shroud block has a circumferential segment, wherein said circumferential segment has longitudinally spaced apart, generally opposing, and generally longitudinally outward facing first and second sides, and wherein said first side has a generally longitudinally outward projecting first ledge and has a first side portion disposed radially outward of said first ledge;
    b) a ceramic inner shroud including a first hook portion longitudinally and radially surrounding said first ledge; and
    c) a first spring attached to one of said first side portion and said first hook portion and unattachedly and resiliently contacting the other of said first side portion and said first hook portion.

2. The turbine assembly of claim 1, wherein said first ledge defines a radially-innermost portion of said first side.

3. The turbine assembly of claim 2, wherein said first ledge is aligned generally parallel to said longitudinal axis.

4. The turbine assembly of claim 3, wherein said first side portion is aligned generally perpendicular to said longitudinal axis.

5. The turbine assembly of claim 4, wherein said first spring is a first leaf spring.

6. The turbine assembly of claim 5, wherein said first leaf spring consists essentially of a metal material.

7. The turbine assembly of claim 6, wherein said circumferential segment of said outer shroud block consists essentially of metal and wherein said ceramic inner shroud consists essentially of a ceramic matrix composite.

8. The turbine assembly of claim 1, wherein said first spring is a first leaf spring.

9. The turbine assembly of claim 8, wherein said first leaf spring consists essentially of a metal material.

10. The turbine assembly of claim 9, wherein said circumferential segment of said outer shroud block consists essentially of metal and wherein said ceramic inner shroud consists essentially of a ceramic matrix composite.

11. A turbine assembly comprising:
    a) a turbine stator having a longitudinal axis and an outer shroud block, wherein said outer shroud block has a circumferential segment, wherein said circumferential segment has longitudinally spaced apart, generally opposing, and generally longitudinally outward facing first and second sides, wherein said first side has a generally longitudinally outward projecting first ledge and has a first side portion disposed radially outward of said first ledge, and wherein said second side has a generally longitudinally outward projecting second ledge and has a second side portion disposed radially outward of said second ledge;
    b) a ceramic inner shroud including longitudinally spaced apart, generally opposing, and generally longitudinally inward facing first and second hook portions, said first hook portion longitudinally and radially surrounding and contacting said first ledge, and said second hook portion longitudinally and radially surrounding and contacting said second ledge;
    c) a first spring attached to one of said first side portion and said first hook portion and unattachedly and resiliently contacting the other of said first side portion and said first hook portion; and
    d) a second spring attached to one of said second side portion and said second hook portion and unattachedly and resiliently contacting the other of said second side portion and said second hook portion.

12. The turbine assembly of claim 11, wherein said first hook portion has a first curved region, wherein said second hook portion has a second curved region, wherein said first and second curved regions have longitudinally-outermost points which are longitudinally spaced apart a first longitudinal distance, and wherein said ceramic inner shroud has a longitudinal length equal to said first longitudinal distance.

13. The turbine assembly of claim 12, wherein said first ledge is aligned generally parallel to said longitudinal axis and wherein said second ledge is aligned generally parallel to said longitudinal axis.

14. The turbine assembly of claim 13, wherein said first ledge has a radially-outermost first surface, wherein said second ledge has a radially-outermost second surface, wherein said first hook portion contacts said first surface, and wherein said second hook portion contacts said second surface.

15. The turbine assembly of claim 14, wherein said first ledge defines a radially-innermost portion of said first side and wherein said second ledge defines a radially-innermost portion of said second side.

16. The turbine assembly of claim 15, wherein, other than said first and second surfaces, said ceramic inner shroud is spaced apart from said outer shroud block.

17. The turbine assembly of claim 16, wherein said first side portion is aligned generally perpendicular to said longitudinal axis and wherein said second side portion is aligned generally perpendicular to said longitudinal axis.

18. The turbine assembly of claim 17, wherein said first spring is a first leaf spring and wherein said second spring is a second leaf spring.

19. The turbine assembly of claim 18, wherein said first and second leaf springs each consist essentially of a metal material.

20. The turbine assembly of claim 19, wherein said circumferential segment of said outer shroud block consists essentially of metal and wherein said ceramic inner shroud consists essentially of a ceramic matrix composite.

* * * * *